Figure 1:
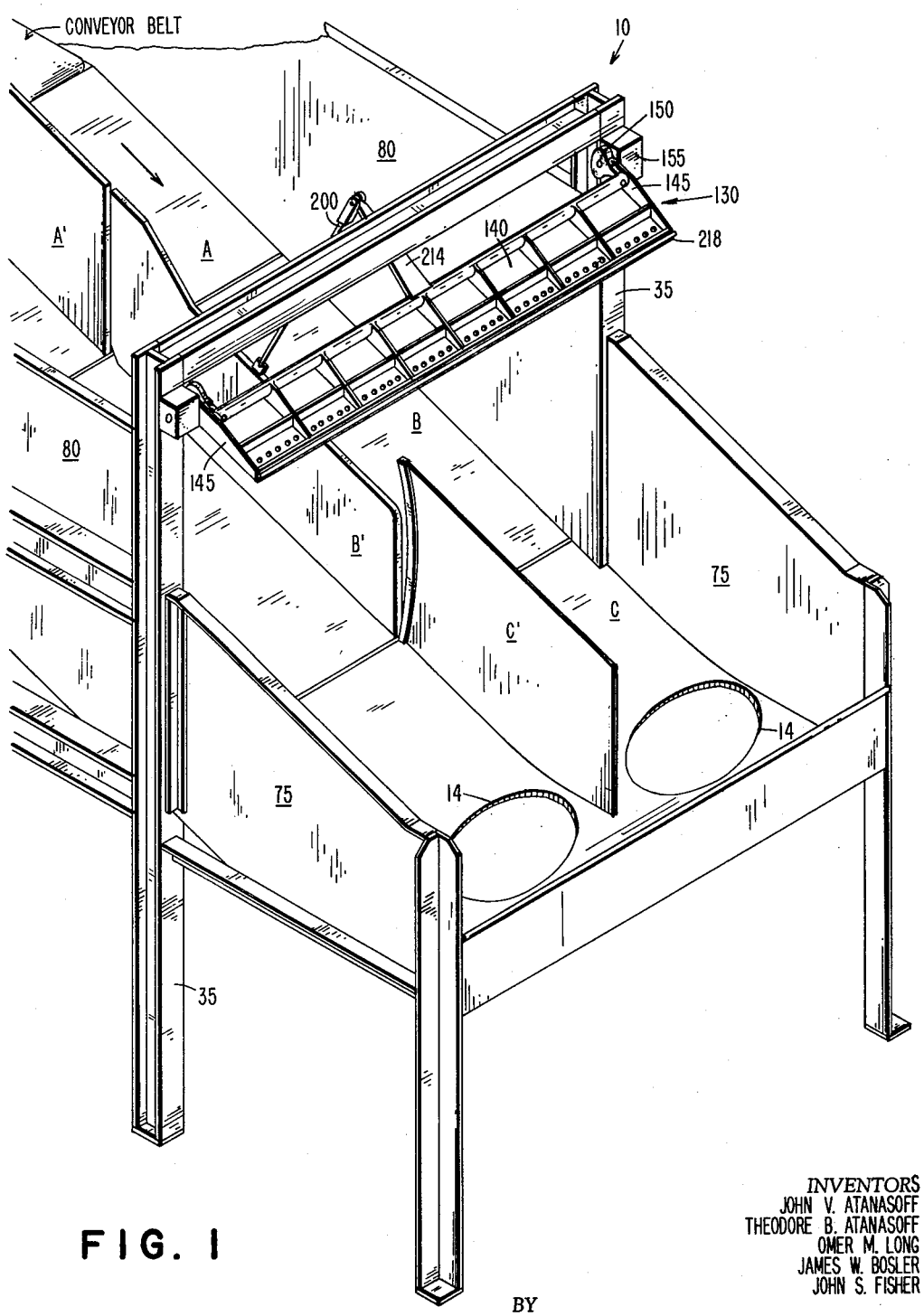

June 9, 1964   J. V. ATANASOFF ETAL   3,136,401
CHUTES FOR MAIL SORTING SYSTEMS
Filed May 23, 1962   5 Sheets-Sheet 1

INVENTORS
JOHN V. ATANASOFF
THEODORE B. ATANASOFF
OMER M. LONG
JAMES W. BOSLER
JOHN S. FISHER
BY

ATTORNEY

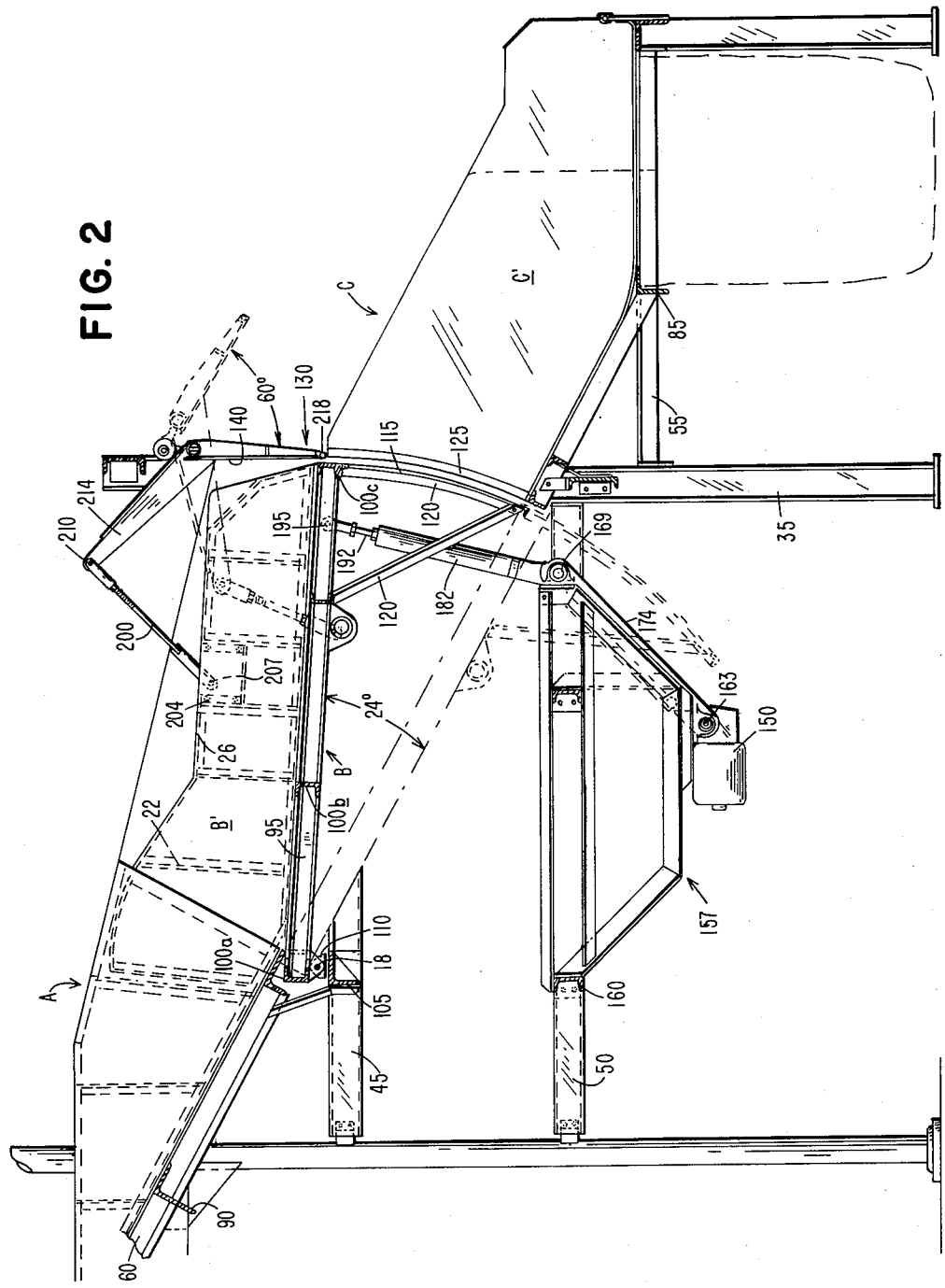

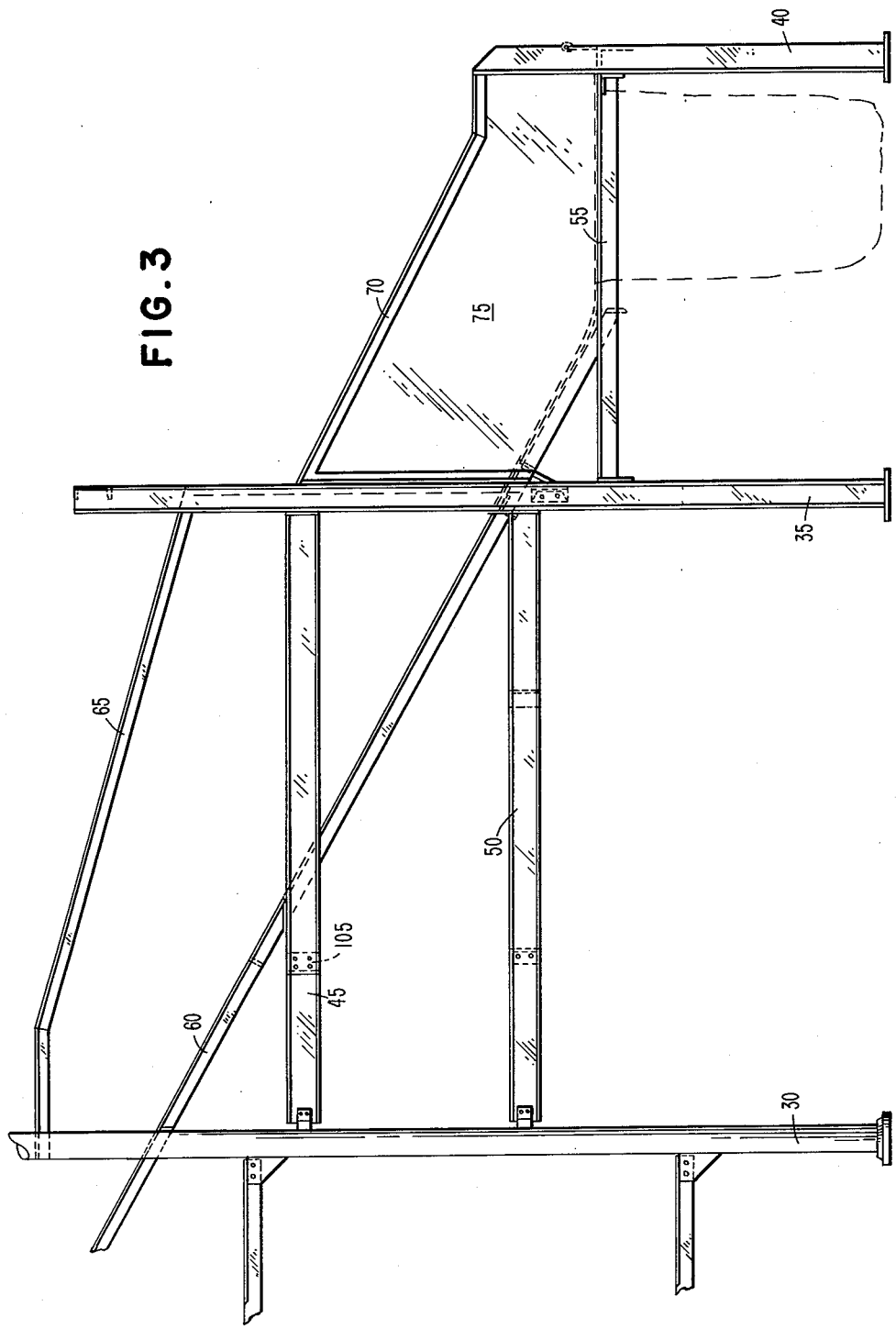

June 9, 1964　　　J. V. ATANASOFF ETAL　　　3,136,401
CHUTES FOR MAIL SORTING SYSTEMS

Filed May 23, 1962　　　　　　　　　　5 Sheets-Sheet 4

United States Patent Office 3,136,401
Patented June 9, 1964

3,136,401
CHUTES FOR MAIL SORTING SYSTEMS
John V. Atanasoff, Theodore B. Atanasoff, Omer M. Long, James W. Bosler, and John S. Fisher, Frederick, Md., assignors to Aerojet-General Corporation, Azusa, Calif., a corporation of Ohio
Filed May 23, 1962, Ser. No. 197,114
10 Claims. (Cl. 193—32)

This invention relates to the subject matter of a copending application, filed by John V. Atanasoff et al., S.N. 4322, Jan. 25, 1960. For "Article Sorting System," now Patent No. 3,033,366.

In the copending application a complete system is disclosed, including a conveyor belt for packages having a diverting mechanism which pushed packages off the moving belt into chutes in a selective manner. The chutes disclosed in the prior application transferred the packages by gravitational effect to waiting mail bags at their lower ends, the upper ends of the chutes being adjacent the belt edge or adjacent secondary transfer belts from a main belt. In the chutes, as hereinbefore disclosed, certain obstruction means were utilized for stopping the flow of packages along the length of the chute, for flow control purposes. Thus, the chutes were provided with swinging gates approximately midway of their length and such gates could be controlled by an operator standing at the back so that when it became necessary to change the group of articles being sorted the operator could stop package flow, gate actuation being responsive to changing of groups and rotation of the rotary bag holder.

In actual operation of the gate arrangement it was found that occasionally a large package traveling rapidly might, by sheer momentum, roll over the top of the gate, thus mixing the sorted articles from one group with those of another group. It was also found that heavy packages with low coefficient of friction would strike the gate a very hard blow and possibly damage the package and in time have a deleterious effect on the gate mechanism.

It is an object of the present invention to provide a chute structure, and in particular a package flow stop means, which will overcome the above drawbacks.

It is another object of the invention to provide a chute which can be made extremely rugged in construction and readily assembled of relatively simple components.

It is still a further object of the invention to provide a chute which may be easily equipped with safety devices to prevent damage to packages or to mechanism.

Other objects and features of the invention will be apparent from the detailed description to follow.

Briefly, the invention comprises a chute having three sections which normally have package support or floor surfacing in a common slant plane. However, the intermediate section of the chute is pivotally mounted and can be swung upwardly to substantially a horizontal position whereby flow of packages is virtually stopped. In coaction with the upward rise of the intermediate section, a pivoted gate swings downwardly to a position whereat it meets the free edge of the intermediate section at its upper or flow slowing or stopping position. Thus, the coaction is such that the upward movement of the intermediate section removes the effect of gravity from acting on packages, or substantially removes such effect, while the downwardly swinging gate positively prevents any package from dropping off the raised intermediate section. A further effect of the arrangement is found in the lowering of the intermediate section, with packages thereon. Thus, packages must now start moving under gravitational force from a point midway or downstream of midway of the length of the chute and, accordingly, the momentum built up in traversing the lowermost portions, namely, part of the intermediate section and the exit section, is less than would be the case if the package had been moving with increasing speed from the very top or entrance section of the chute. Such inherent effect is advantageous, in that the chute can be operated with the intermediate section in raised position to receive a number of packages, and then under operator control be lowered to permit the packages to traverse the remainder of the lower portion of the chute to the very bottom where the packages drop into bags. Accordingly, the packages traverse a path with interrupted flow so that they cannot build up any high rate of speed at any time. Although control can be completely manual, a semi-automatic control circuit is preferred having means which keeps the intermediate section in raised position until a lowering switch is actuated by an operator. Lowering of the section permits any packages received thereon to continue their sliding course to the chute bottom to drop into a bag and actuates a time delay means which keeps the section in the lowered position for a predetermined time then automatically causes the section to return to its raised position.

Figure 3A:
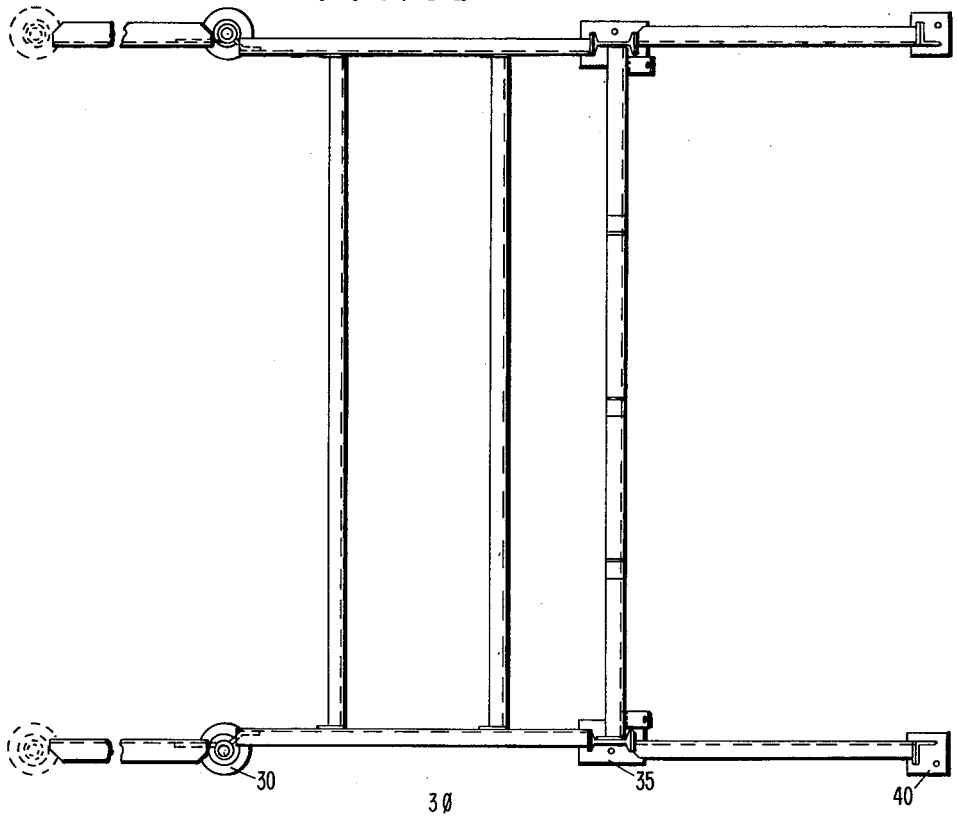
Figure 6:
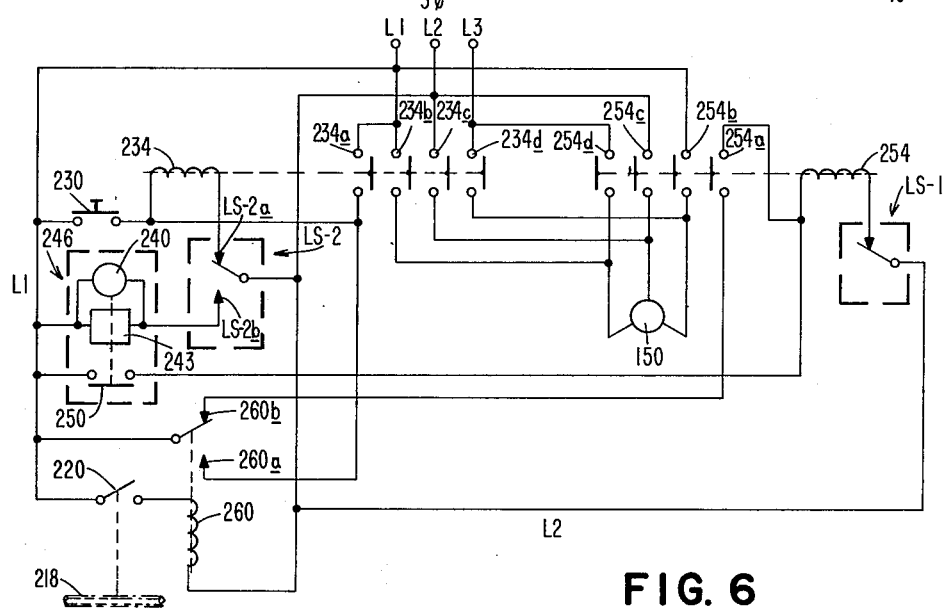
Figure 4:
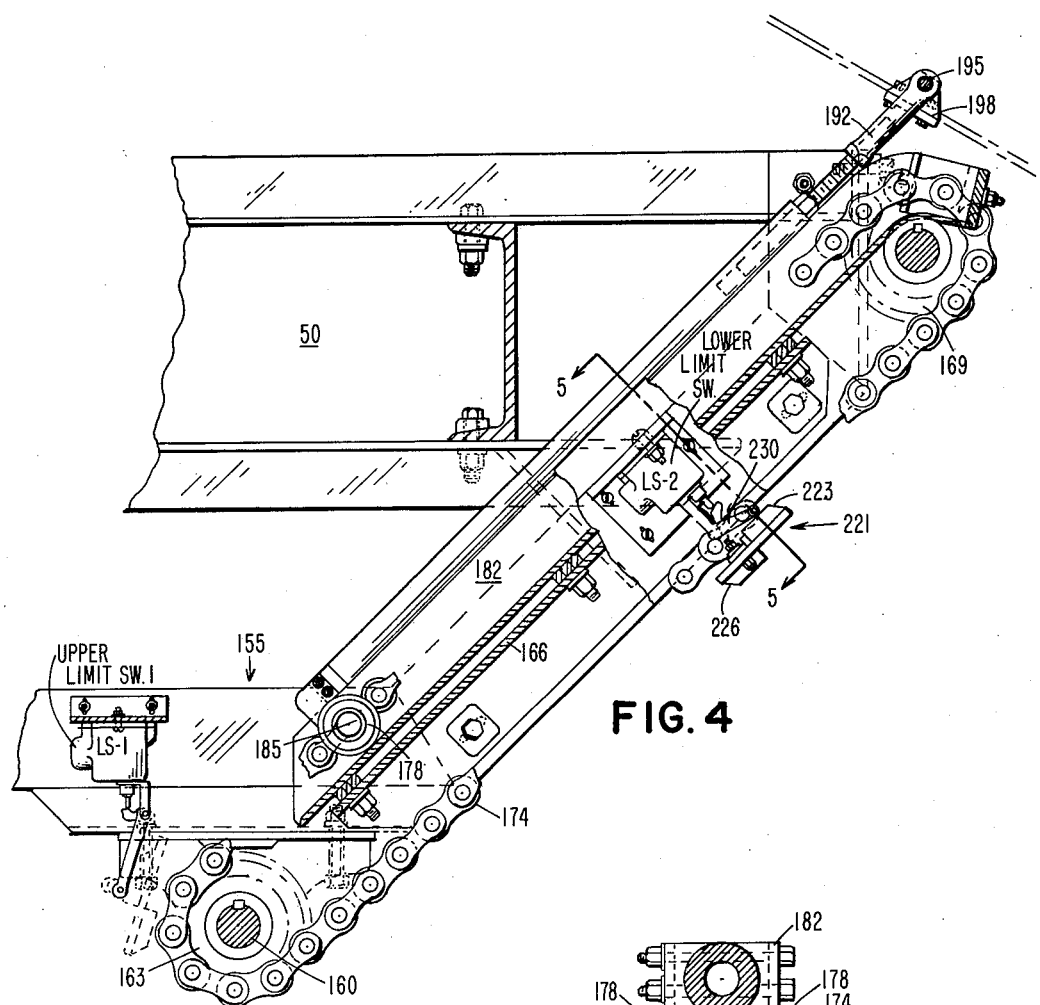
Figure 5:
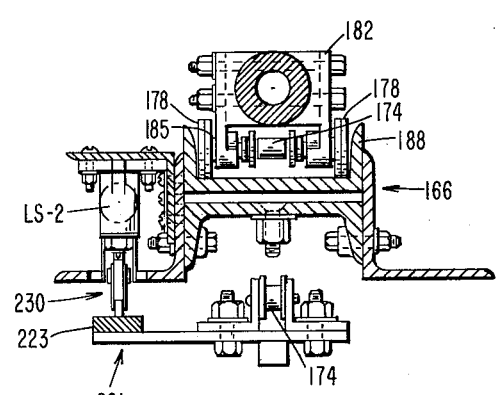

A detailed description of the invention now follows in conjunction with the appended drawing, in which:

FIG. 1 is a perspective view of the chute construction;
FIG. 2 is an elevation partially in section;
FIG. 3 shows the channel iron or girder framework of the chute structure;
FIG. 3a is a plan view of the frame structure;
FIG. 4 is a detail of the actuating mechanism of the intermediate section;
FIG. 5 is a section through 5—5 of FIG. 4; and
FIG. 6 is a schematic diagram of the control circuit.

Referring now to FIG. 1, the present embodiment of the invention comprises a chute 10 having smooth floored sections, such as an entrance section A, an intermediate section B, and an exit section C. The chute, of course, is constructed at a slant so that packages carried from a conveyor belt, as designated, move onto the entrance section A and slide downwardly until dropping through apertures 14 into bag so designated and shown in phantom lines. See FIG. 2. A particular conveyor belt and bag-holding construction does not form any part of the present invention and may be of conventional arrangement, or as shown in the previously mentioned patent application.

It will be noted that the three sections of the chute are divided into the channels by means of medium walls, such as A', B' and C'. The intermediate section B is carried pivotally at 18 (FIG. 2) at its upstream end and its median wall B' is integrally secured to the floor thereof. The details of securement are not shown, but it will be understood that any conventional fastening methods may be utilized, such as welding, etc. In the present instance, the median wall B' (FIG. 2) as in fact the other median walls, are economically constructed of angle iron pieces, such as 22 and 26, to form an inner frame which may then be covered with smoothly faced sheet metal, all in a manner well understood by persons skilled in the art. Many alternative forms of construction are possible, as will be appreciated.

The supporting arrangement for the chute may be of simple channel and angle iron arrangement, as shown in FIG. 3, comprising columns such as 30, 35 and 40 and side braces 45, 50 and 55. Inclined angle irons such as 60, 65 and 70 support the sheet metal construction of the chute outer walls such as 75 and 80 (FIG. 1). The entire framework may be assembled as by angles and rivets, clearly shown in FIG. 3, and FIG. 3a.

It is to be understood that any suitable framework arrangement may be used, all in accordance with standard engineering principles, and that such framework may be designed in countless ways and the details thereof are not essential aspects of the invention.

The floor of the entrance section A and the exit section C may be braced in any suitable manner and are of sheet metal construction. Such bracing may consist of transverse angle irons such as 85 and 90 (FIG. 2) suitably fastened to longitudinal rails such as 55 and 60, respectively.

The intermediate chute section B is pivotally mounted, as hereinbefore mentioned, and has a sheet metal floor construction supported by a framework of channels or angle irons, such as 95, longitudinally oriented, and 100a, b and c, transversely disposed. A transverse angle iron 105 carried intermediate the beams 45 has ears 110 at its ends to coact with depending ears at the end of channel 100a for the purpose of providing pivotal movement, the ears being rotatively pinned together at 18 in a well known manner. The downstream edge of intermediate section B carries, attached to channel 100c, a sheet metal guard plate 115 braced by angle irons such as 120 disposed intermediate beam 95 and side angle irons 120, which are integrally secured to the guard 115 for bracing and support thereof. The guard plate and the angle irons 120 are suitably curved as shown in FIG. 2 so that the intermediate section B can swing upwardly or downwardly from the full line position to the dash line position with the guard plate describing a smooth arc and being at all times with fixed spacing in regard to the reinforcement edge 125 of the upstream end of the wall C'.

From the description thus far given, it will be apparent that the intermediate section B may swing up and down from a position where it is aligned or coplanar with entrance section A and exit section C to a position where it is sufficiently horizontal (as shown in solid lines) to substantially remove gravitational effect of any packages thereon, this being a horizontal or close to horizontal position, the actual arc of traverse of the intermediate section is about 24°, as will be noted on FIG. 2.

The actuation and mode or means for effecting movement of the intermediate section will be later described.

Pivotally carried intermediate the posts or columns 35 is a gate 130 which may be of lattice-like construction, as shown generally on FIG. 1, and having a sheet metal facing 140 and side flanges such as 145 suitably provided with trunnions such as 150 rotatively carried in bearings 155 secured to respective posts 35, as shown generally in FIG. 1. Thus, the gate is capable of rocking (see FIG. 2) through an angle of about 60° and it will be noted by comparing FIGS. 1 and 2 that when the intermediate section B is coplanar with sections A and C, the gate is in raised position. On the other hand, when the intermediate section B is in raised position, the gate has swung to its lower position effectively closing off the downstream end of section B.

The driving means of the intermediate section B and the gate 130 comprising an electric motor 150 carried in a suitable angle iron framework 157 (shown in FIG. 2) is secured to the longitudinal rails 50 by means of cross channels or rails 160 in a manner which will be readily understood by persons skilled in the art. It will be noted that the framework 157 is such as to suspend the motor substantially below the rails 50 to allow space for operation of a mechanism shown in detail on FIG. 4. Thus, the motor acting through a conventional gear reduction effects rotation of a shaft 160 to which is keyed a sprocket wheel 163 carried at the lower end of a frame 166, there being a similar sprocket wheel 169 at the upper end of the frame and a sprocket chain 174 extending around the sprocket wheels. The lower sprocket wheel may be supported in a pillow block carried by frame 155, as shown, while the upper sprocket wheel may be carried in a similar manner suitably secured to frame 166 and to longitudinal rail 50. As seen on FIG. 5, the sprocket chain 174 is supported on both sides by rollers 178 having trunnion bearings in a thrust member 182, which thrust member is secured pivotally at its lower end to the sprocket chain by means of the stub shafts 185 which journal rollers 178 to the thrust member. The rollers ride in channel 188, which is part of frame 166. Thus, it will be appreciated that as the sprocket chain moves in either direction, it will carry the thrust member 182 therewith. Actually, the frame 166 is primarily a guide frame for the sprocket chain and the thrust member and not necessarily a supporting frame for the sprocket wheels, which are primarily supported in pillow blocks as previously described. The particular structural arrangement may be varied to a considerable extent and a large number of support arrangements may be utilized, the essential feature being that sprocket wheels are fixed relative to ground, though rotative, and that the chain carries a thrust member which can be actuated upwardly or brought back downwardly depending on the direction of rotation of sprocket wheel 160 in accordance with a control circuit to be later described.

Comparing FIGS. 2 and 4, it will be noted that the thrust member 182 in FIG. 2 is in maximum forward position while in FIG. 4 it is in maximum withdrawn position. These positions correspond to raised and lowered positions, respectively, of intermediate section B, the thrust member being articulated at pivot 195 through a threadedly adjustable rod 192 to a rail such as 95, such rail, in this instance, being centrally disposed relative the transverse dimension of the chute section. Suitable reinforcement for the pivotal trunnion connection may be provided as shown by the angle piece 198. Thus, reversible movement of chain 174 reversibly actuates intermediate section B, and movement of the intermediate section actuates gate 130 by means of an additional threadedly adjustable thrust member 200 pivoted at its lower end in a suitably reinforced pocket or slot 204 arranged in the top edge of median wall B', the pivot pin being indicated as 207 in FIG. 2. The upper end of rod 200 is pivoted at 210 to a lever 214 integrally and rigidly connected to gate 130. The linkage arrangement thus described effects swinging of the gate through a 60° angle. Thus, as the intermediate section B goes down, the gate swings upwardly to the dashed position shown in FIG. 2. Alternately, when the intermediate section moves upwardly, the gate moves down to the solid line position shown to close off the downstream end of this section. The trunnion axis of the gate is such as to fully insure clearance for any package which may slide down the chute, particularly when the gate is in the dashed position.

In essence, the coaction of the intermediate section and the gate provides a bin, or rather dual bins, considering the median wall B', so that package flow is interrupted midway from beginning to end of the overall chute. The effect is to store packages in the dual bins provided by the raised position of section B and to control final velocity of package flow.

Gate 130 carries at its lower edge a pneumatic tube 218 which is of conventional construction and is the sensing element of a conventional safety switch 220, shown on the schematic diagram of FIG. 6. Thus, in the event of a package catching under the edge of the gate, compression of the tube actuates switch 220 which has an overriding control on the system so that the chute section B is actuated downwardly while the gate 130 is swung upwardly to effect release of the caught package in the chute section C.

The electrical control system utilizes the sprocket chain 174 (FIGS. 4 and 5) which carries a cam device 221 consisting of a pair of reversely sloped cam blocks 223 and 226. The blocks actuate respective upper and lower limit switches LS-1 and LS-2, through conventional roller and bell-crank lever arrangements such as 230 carried on frame 166. It should be noted that the terms "upper" and "lower" refer to the positions of chute section B and not to the physical placement of switches LS–1 and LS–2. Thus, if the chain be moving clockwise, that is, raising the push rod or ram 182 to raise chute section B, the cam block 226 will actuate LS–1 to stop (via the circuitry of FIG. 6) movement of chute section B when it has reached the full line position shown in FIG. 2. On the other hand, when the chute section B is lowered, upon reverse movement of the chain, to the position shown in FIG. 4, the cam block 223 actuates the switch LS–2 and, as will be described in conjunction with FIG. 6, the ram 182 then remains in the lowermost position for a predetermined period of time automatically returning to the raised position.

In referring now to the electrical circuitry of FIG. 6, it should be understood that the movable section B is normally kept in the raised or package storing position. Lowering of this section to transfer parcels to the lower section C of the chute is effected by depressing the momentary contact, push-button switch 230. This completes a circuit from line $L_1$ through relay coil 234 and normally closed contact LS–2a of lower limit switch LS–2 to line $L_2$. The resulting current flow through coil 234 closes contacts 234a, b, c, d. Closing of contact 234a provides an alternate path by which current may flow from $L_1$ through coil 234 to $L_2$ and thereby seals in the four contacts after switch 230 is opened. Closing of contacts 234b, c and d applies power to the motor 150 which causes it to drive the movable chute section B toward the lowered or open position. This continues until the chute section has essentially reached its lowermost or fully open position. At that time the lower limit switch LS–2 is actuated by cam block 223 opening normally closed contact LS–2a and closing the normally open contact LS–2b. Opening contact LS–2a breaks the circuit through coil 234 allowing its switch contacts to open, thus stopping the motor. Closing contact LS–2b applies power to a timing motor 240 and electric clutch 243 of a conventional time delay relay 246. After the preset timing period, which may be several seconds, switch contacts 250 close. This completes a circuit from line $L_1$ through the relay coil 254 and normally closed limit switch LS–1 to $L_2$ to close contacts 254a, b, c, and d. Closing of contact 254a seals in all coil 254 contacts by providing an alternate circuit, through that coil. Closing of contacts 254b, c, and d applies power to the motor 150 with a reversed phase rotation so that the motor now rotates in direction to raise or close the chute section B. As soon as the chute section has raised slightly, limit switch LS–2 is released by cam block 223 so that contact LS–2a closes and LS–2b opens. The resulting removal of power from clutch 243 allows the time delay relay to reset, opening contacts 250. However, since relay 254 is sealed in through contact 254a, the motor continues to run until the chute has essentially reached its uppermost or closed position, at which time the upper limit switch LS–1 is engaged by cam block 226 causing its normally closed contact to open. This breaks the circuit through coil 254 allowing switch contacts 254a, b, c, and d to open, and the motor stops. The chute section B then remains in the closed position until push-button switch 230 is again closed.

As previously mentioned, if a package should lodge in the movable chute section so that it will jam between the gate and the chute while the chute is raising, the pressure on the pneumatic tube 218 on the bottom of the gate will close the pneumatic switch 220. This in turn energizes relay coil 260 which opens normally closed contact 260a and closes normally open contact 260b. Opening contact 260a breaks the holding circuit through coil 254 allowing contacts 254a, b, c and d to open and to stop the motor. Closing contact 260b energizes coil 234 which closes contacts 234a,b, c and d, and thus automatically puts the system into chute-lowering cycle and the whole process described above will be followed just as though push-button switch 230 had been closed.

Having thus described our invention, we are aware that various changes may be made without departing from the spirit thereof and, therefore, do not seek to be limited to the precise illustrations herein given, except as set forth in the appended claims.

We claim:

1. In a device of the class described, a chute having an entrance section, an intermediate section, and an exit section wherein said intermediate section is disposed between the other sections and is movably mounted so as to be alternately coplanar with said other sections to effect full flow, or out of the plane thereof to lessen flow; and actuating means for effecting alternate positioning of said intermediate section, said intermediate section having a flow-dividing wall extending in the flow direction, said other sections having flow-dividing walls in the same plane as the flow-dividing wall of said intermediate section and being integrally movable therewith, including a flow stop element co-acting with said intermediate section and disposed adjacent the downstream end thereof, and additional actuating means for actuating said element to alternation positions to permit or block flow through said intermediate section, said additional actuating means comprising a thrust member connected between the flow dividing wall of said intermediate section and the flow stop element, and a control means for said actuating means comprising a pressure-responsive edging carried by said stop element, and means responsive to pressure exerted on said edging to effect reversal of movement of said actuating means.

2. In a device of the class described, a chute having an entrance section, an intermediate section, and an exit section wherein said intermediate section is disposed between the other sections and is movably mounted so as to be alternately coplanar with said other sections to effect full flow, or out of the plane thereof to lessen flow; and actuating means for effecting alternate positioning of said intermediate section, said actuating means comprising a source of motive power, a pair of spaced sprocket wheels, said source of motive power being connected to drive at least one of said sprocket wheels, a sprocket chain extending between said sprocket wheels, a push rod having an end connected to said chain, whereby reversible travel of said chain effects correspondingly reversible travel of said push rod, and means comprising spaced limit switches for effecting reversible travel of said chain, and means connecting said push rod to said intermediate section.

3. In a device of the class described, a chute having an entrance section, an intermediate section, and an exit section generally coplanar with said entrance section wherein said intermediate section is disposed between the other sections and is movably mounted so as to be alternately coplanar with said other sections to effect full flow, or out of the plane thereof to lessen flow; and actuating means for effecting alternate positioning of said intermediate section, said entrance and exit sections having a generally downward permanent slope to effect gravitational flow of objects, said intermediate section effecting in one position a complete downward path when coplanar with said other sections, and being positionable by said actuating means in a relatively upward position to lessen gravitational flow, including a flow stop plate means disposed adjacent the downwstream end of said intermediate section, and additional actuating means for actuating said plate means to alternate positions to permit flow through said intermediate section when said intermediate section is coplanar with said other sections or to positively block flow through said intermediate section when said intermediate section is in said upward position, said actuating means for said intermediate section comprising a push rod connected thereto and motive power means for driving said push rod to raise or lower said intermediate section, said intermediate section having a flow dividing wall extending longitudinally in the flow direction, said additional actuating means comprising a push rod connected intermediate said wall and said flow stop plate means.

4. A chute device comprising a section reversibly movable between two positions and means for moving said section comprising a ram device operatively connected thereto, a drive means for actuating said ram device and reversible motor means for operating said drive means, a control system for said motor means comprising a control means carried by said drive means and movable therewith and operable to condition said control system for stopping said motor means at a predetermined limit of movement of said section in either direction, said control means comprising cams, said control system comprising limit switches engageable by said cams in respective directions of motion of said section.

5. A chute device comprising a section reversibly movable between two positions and means for moving said section comprising a ram device operatively connected thereto, a drive means for actuating said ram device and reversible motor means for operating said drive means, a control system for said motor means comprising a control means carried by said drive means and movable therewith and operable to condition said control system for stopping said motor means at a predetermined limit of movement of said section in either direction, said control system comprising electric circuitry having a time delay component operative to maintain said section at one limit of movement for a predetermined period of time, and to automatically effect movement of said section to the other limit of movement thereof at the termination of said time period, said circuitry being operative to normally maintain said section at said other limit of movement and having manual means under operator control for initiating movement of said section to said one limit, and said circuitry comprising limit switches actuated by said control means at said respective limits of movement of said section in either direction and being operative to effect functioning of said time delay component at said one limit of travel and to condition said manual means for operator control for return movement of said section to said one limit of movement.

6. In a device of the class described, a chute comprising a pivotal section and disposed for movement between an upper and a lower position, actuating means for said section comprising a sprocket chain disposed below said section and mounted for reversible movement, a rod pivotally secured to said sprocket chain at one end and pivotally secured to said section at the other end wherein reversible movement of said sprocket chain effects pivotal motion of said section in a respective up or down direction, control circuitry means for effecting reversible movement of said sprocket chain and switch means comprising elements carried by said sprocket chain for limiting movement thereof in either direction.

7. In a device as set forth in claim 6, said elements comprising a pair of cams and said switch means comprising a pair of spaced switches disposed adjacent said sprocket chain and engageable by respective cams.

8. In a device of the class described, a chute comprising a section pivotally mounted for movement from a lower to an upper position, means comprising electric motor for motivating said section between said positions, circuitry control means for controlling said electric motor whereby said section is normally maintained in an upper position to receive packages when said section is substantially horizontal, said circuitry means comprising a manual control element operative to move said section to lower position wherein packages may slide by gravity therefrom, said circuitry means comprising a timer element for maintaining said section in lower position for a predetermined extent of time and thereafter return said section to said substantially horizontal position.

9. In a device as set forth in claim 8, including a gate element pivotally mounted adjacent the discharge end of said section and synchronized for movement therewith wherein said gate element swings from an open position whereat packages may leave said section without being impeded when said section is moving to lower position and said gate element swinging to a closed position to block the discharge end of said section as said section moves to the upper position, said gate element having a lower edge provided with a switch actuating sensing element effective to engage a package at the discharge end of said section, and an overriding control system effective to control said circuitry means to move said section to lower position and said gate to upper position responsive to an engagement between a package and said sensing element.

10. In a device of the class described, a chute comprising an upper section and a lower section, said lower section being normally coplanar with said upper section in a downwardly sloping plane to effect gravitational flow, means for pivotally mounting said lower section adjacent an upstream end whereby said lower section may be swung reversibly between said coplanar position and a position upwardly thereof to counteract gravitational effect, a flow stop element pivoted on a relatively fixed axis and disposed adjacent the downstream end of said lower section and movable from a position to block flow through said lower section when said lower section is in upper position, to a position of complete avoidance with engagement of objects flowing down said lower section when said lower section is in coplanar position, an actuating means for said lower section and said flow stop element for effecting coaction therebetween to position said flow stop element to flow blocking or flow permitting positions responsive to the position of said lower section relative to said upper section, said actuating means comprising a timing element for controlling the time period during which said lower section is in said lower position, said actuating means comprising a safety control system having a sensing element carried by said flow stop element, said system having means to stop movement of said actuating means in the event of engagement of said sensing element with an object on said lower section.

References Cited in the file of this patent

UNITED STATES PATENTS

| | | |
|---|---|---|
| 299,585 | Rosensteel | June 3, 1884 |
| 591,364 | Turner | Oct. 5, 1897 |
| 610,690 | Ryder | Sept. 13, 1898 |
| 651,433 | Campbell | June 12, 1900 |
| 1,287,711 | Lichtenberg | Dec. 17, 1918 |
| 1,890,809 | Forman | Dec. 13, 1932 |
| 1,982,442 | Lubkin | Nov. 27, 1934 |
| 2,495,541 | Nolan | Jan. 24, 1950 |
| 2,554,751 | Powell | May 29, 1951 |
| 2,830,687 | Baker | Apr. 15, 1958 |
| 2,861,800 | McKee et al. | Nov. 25, 1958 |
| 2,865,578 | Hennessy | Dec. 23, 1958 |

FOREIGN PATENTS

| | | |
|---|---|---|
| 543,127 | Belgium | Dec. 15, 1955 |
| 842,273 | Great Britain | July 27, 1960 |
| 1,036,754 | Germany | Aug. 14, 1958 |